(No Model.)

F. W. TORNBERG.
REVOLVING TOOTH BRUSH.

No. 347,900. Patented Aug. 24, 1886.

Attest.
Will T. Norton
W. E. Chaffee

Inventor.
Fredrik W. Tornberg.
by John J. Halsted & Son
his Atty's.

N. PETERS, Photo-Lithographer, Washington, D. C.

UNITED STATES PATENT OFFICE.

FREDRIK WILHELM TORNBERG, OF STOCKHOLM, SWEDEN.

REVOLVING TOOTH-BRUSH.

SPECIFICATION forming part of Letters Patent No. 347,900, dated August 24, 1886.

Application filed December 10, 1885. Serial No. 185,271. (No model.)

*To all whom it may concern:*

Be it known that I, FREDRIK WILHELM TORNBERG, a subject of the King of Sweden, and a resident of Stockholm, Sweden, have invented an Improved Revolving Tooth-Brush, of which the following is a specification.

The object of this invention is the construction of a tooth-brush, by means of which the teeth may be cleaned as easily on the inner as on the outer side, the brushing being performed vertically, instead of horizontally, as before, which latter mode of brushing has proved prejudicial to the enamel of the teeth.

Figure 1:
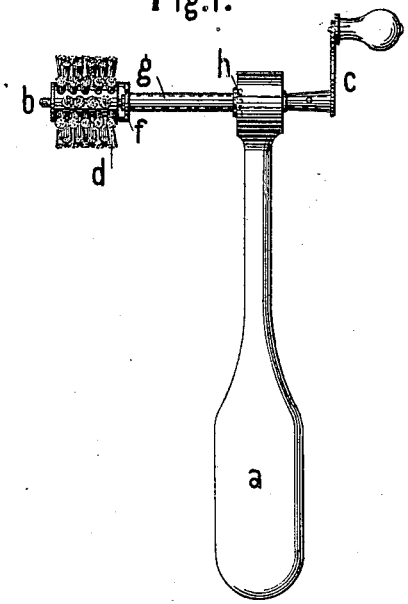
Figure 2:
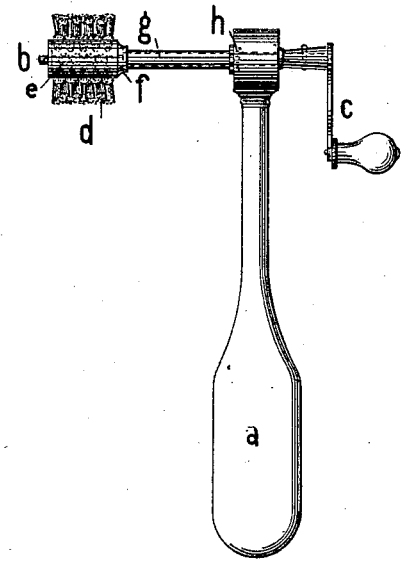
Figure 3:
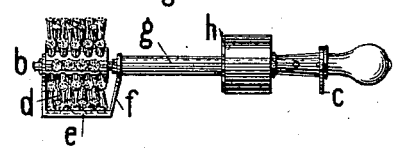
Figure 4:
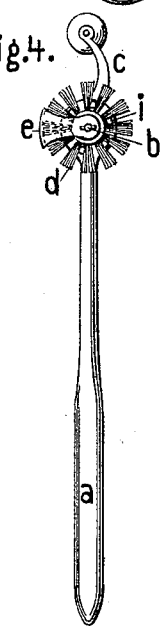

Figure 1 is an elevation of such a brush adjusted for brushing the left outside of the teeth; Fig. 2, the same adjusted for brushing the inside of the teeth. Fig. 3 is a plan, and Fig. 4 an end, view of the said brush.

The brush consists of a handle, $a$, in the top of which is a shaft, $b$, having on one end a crank, $c$, which may turn round. At the other end of the shaft $b$ is secured a brush, $d$, partly embraced by a movable fork-shaped casing, $e$. The latter may be adjusted so as to cover a certain part of the brush, leaving its remaining surface free. This adjustment of the casing may be effected in many ways. On the tooth-brush represented on the drawings this has been effected by joining one of the two legs $f$, pivoted on the shaft $b$, with a tube, $g$, embracing the said shaft $b$, which tube is at the end provided with some pins $h$, which may be pushed into any of the holes $i$, made into the side of the handle $a$.

On brushing the outer left side of the teeth the brush, with the casing adjusted as shown, Fig. 1, is brought against the teeth, and then, the handle $a$ being held with one hand and the brush pressed against the teeth, the crank $c$ is turned with the other hand, whereby the brush $d$ is caused to rotate and rubs the teeth vertically. When then the inner side of the teeth is to be brushed, the casing is readjusted to the position indicated in Fig. 2 by pressing the finger on its inner leg, whereby the tube $g$ is pulled back and the pins $h$ pushed out of the holes $i$. Then the fork $e$ (while the pins are still retained) is turned in the position wanted, after which the leg is released and the pins allowed to get into the holes beneath. Then the brush is introduced into the mouth, inside of the teeth, which are now closing on the brush, after which the crank is turned as before.

The casing $e$ has only for its purpose to protect the tongue and the cheeks (when brushing the teeth) from getting into contact with the brush.

Having now particularly described and ascertained the nature of my said invention and in what manner the same is to be performed, I declare that what I claim is—

An improved revolving tooth-brush, consisting of a shaft, $b$, turning in a handle, $a$, and at one end provided with a round brush, $d$, partly covered by an adjustable casing, $e$.

In testimony whereof I have signed my name to this specification in the presence of two subscribing witnesses.

FREDRIK WILHELM TORNBERG.

Witnesses:
NERE A. ELFWING,
JOHN EDBERG.